United States Patent [19]
Tokui

[11] Patent Number: 5,987,532
[45] Date of Patent: Nov. 16, 1999

[54] SINGLE-LINE, SERIES CONNECTED, DATA TRANSFER CONTROL SYSTEM

[75] Inventor: Satoru Tokui, Tokyo, Japan

[73] Assignee: Pioneer Electric Corporation, Tokyo, Japan

[21] Appl. No.: 08/160,463

[22] Filed: Dec. 2, 1993

Related U.S. Application Data

[63] Continuation of application No. 07/802,539, Dec. 5, 1991, abandoned.

[30] Foreign Application Priority Data

Feb. 12, 1991 [JP] Japan .................................... 3-041182

[51] Int. Cl.[6] .................................................. G06F 13/00
[52] U.S. Cl. .......................................... 710/9; 340/825.52
[58] Field of Search ..................... 395/275, 250, 395/200; 370/85.1, 449; 710/3, 9; 340/825.52, 825.07

[56] References Cited

U.S. PATENT DOCUMENTS

| | | | |
|---|---|---|---|
| 3,879,710 | 4/1975 | Maxemchuk et al. | 364/200 |
| 4,360,870 | 11/1982 | McVey | 395/275 |
| 4,493,021 | 1/1985 | Agrawal et al. | 364/200 |
| 4,663,706 | 5/1987 | Allen et al. | 395/200 |
| 4,667,287 | 5/1987 | Allen et al. | 395/800 |
| 4,694,293 | 9/1987 | Sugiyama et al. | 340/825.68 |
| 4,750,114 | 6/1988 | Hirtle | 364/200 |
| 4,773,005 | 9/1988 | Sullivan | 395/275 |
| 4,800,376 | 1/1989 | Suga | 345/1 |
| 4,835,674 | 5/1989 | Collins et al. | 395/275 |
| 4,858,112 | 8/1989 | Puerzer et al. | 364/200 |
| 5,090,013 | 2/1992 | Fadem | 370/85.8 |
| 5,175,822 | 12/1992 | Dixon et al. | 395/275 |
| 5,204,669 | 4/1993 | Dorte et al. | 340/825.52 |
| 5,309,504 | 5/1994 | Morganstein | 379/67 |

FOREIGN PATENT DOCUMENTS

| | | | |
|---|---|---|---|
| 0222920 | 5/1987 | European Pat. Off. | H04N 7/173 |
| 2272252 | 7/1990 | Japan | F24F 11/02 |

*Primary Examiner*—Gopal C. Ray
*Attorney, Agent, or Firm*—Sughrue, Mion, Zinn, Macpeak & Seas, PLLC

[57] ABSTRACT

A plurality of series-connected units, e.g., display units, are controlled by serial command data transmitted from a computer. The computer transmits ID setting command data for the respective units in a sequential manner. A controller of each unit takes in an ID code included in a first-received ID setting command data to employ it as an ID code of the associated unit. Based on an instruction signal from the controller indicating that the ID code has been set, subsequently received ID setting command data are transferred to the following unit.

13 Claims, 4 Drawing Sheets

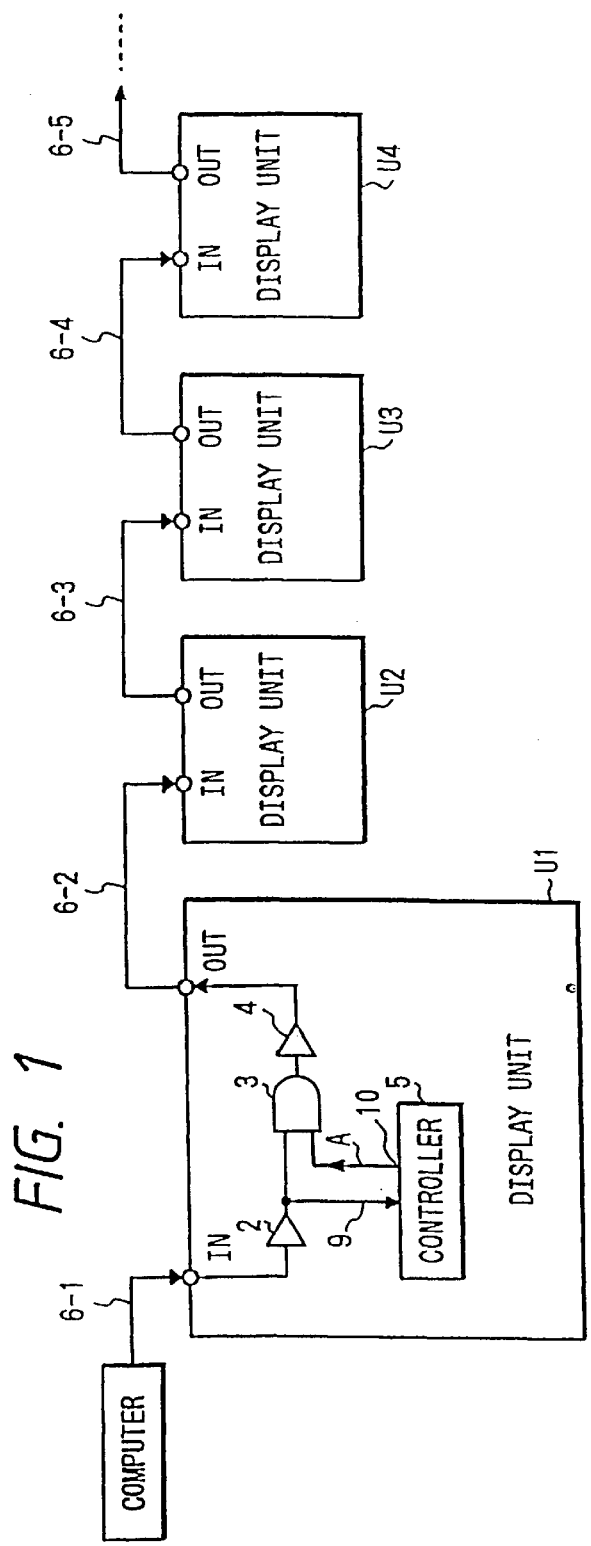

SINGLE-LINE, SERIES CONNECTED, DATA TRANSFER CONTROL SYSTEM

This is a Continuation of Application Ser. No. 07/802,539 filed Dec. 5, 1991, abandoned.

BACKGROUND OF THE INVENTION

The present invention relates to a system for controlling a plurality of units by transferring serial data from a computer. More particularly, the invention is directed to a control system suitable for controlling a display system consisting of a plurality of display units, e.g., projection TVs.

In the following, two conventional communication networks are described in which a plurality of units, e.g., display units U1–U4 using projection TVs, are controlled by transmitting serial data from a computer.

As shown in FIG. 7, a first example is such that a single distributor 7 is interposed between a computer 1 and each of display units U1–U4, and that transmission data from the computer 1 is selectively distributed to either one of the display units U1–U4 by the distributor 7. The selection among the display units U1–U4 involves the process that the distributor 7 decodes an identification code (hereinafter referred to as "ID code") included in the transmission data, which code serves to identify one of the display units U1–U4. Data succeeding the ID code is thereafter taken by, e.g., the display unit U1, which then adjusts the luminance or color of an image as instructed by the data.

As shown in FIG. 8, a second example is such that a computer 1 is connected to each of display units U1–U4 via a bus 8. Specific ID codes are preassigned to the respective display units U1–U4, and an ID code included in transmission data from the computer 1 is decoded by each display unit. If the ID code indicates that the transmission data is directed to, e.g., the display unit U1, the display unit U1 takes in the transmission data. In this example, each of the display units U1–U4 must be provided with setting switches and a memory such as a ROM for setting and storing its own ID code, respectively.

According to the first example (FIG. 7), a network must include the distributor 7 to select from among the display units U1–U4, thus increasing the number of components. From the viewpoint of system expandability, the number of display units distributable by a single distributor 7 is limited, so that additional distributors may have to be provided to increase the number of display units. This makes it difficult to expand a system. Recently, a wide-area display system was developed using a total of 108 display units (a matrix of 9×12). There is some difficulty in transmitting serial data in a system which includes such a large number of display units.

According to the second example (FIG. 8), each of the display units U1–U4 must be provided with hardware such as setting switches for setting an ID code and a ROM for storing the same, again unavoidably increasing the number of components. In addition, because of the system construction employing a bus, a signal attenuates as it goes farther away from the computer 1. This means that there exists a limit of the signal line length, which further imposes a certain limit on display unit expandability. Moreover, with respect to the assignment of specific ID codes to respective display units, if additional display units are to be provided, more specifically, if a large screen is to be implemented by combining display units in a matrix form, ID codes may have to be reassigned or changed over the entire network, depending on the installation position of the additional display units. In such a case, a cumbersome operation of reassigning the ID codes of the respective display units must be performed.

SUMMARY OF THE INVENTION

Therefore, an object of the present invention is to provide a data transfer control system that is readily expandable without requiring any special components.

According to the invention, a data transfer control system for controlling transmission of serial command data to a plurality of units connected in series, comprises:

computer means for transmitting identification setting command data for the respective units in a sequential manner; and means, at each of the plurality of units, for taking in an identification code included in first-received identification setting command data to employ it as an identification code of an associated unit, and for transferring subsequently received identification setting command data to a following unit.

BRIEF DESCRIPTION OF THE DRAWINGS

FIG. 1 is a block diagram showing a data transfer control system according to an embodiment of the present invention;

FIGS. 2(a)–2(c) are diagrams showing exemplary serial data communication formats;

DESCRIPTION OF THE PREFERRED EMBODIMENT

Figure 3:
FIG. 3 is a diagram showing an exemplary ID command data format.

A preferred embodiment of the invention is described with reference to the accompanying drawings. The invention is intended to adjust controlling items of individual units or those of a system as a whole. In the case of a display system of the following embodiment, the white balance, brightness, contrast, etc. of respective display units are either adjusted individually, or those of the entire display system are adjusted as a whole.

FIG. 1 shows a transfer control system according to an embodiment of the invention. As shown in FIG. 1, a plurality of display units U1–U4 are connected to a computer 1 in series via a communication line 6-1 of, e.g., RS-232C and communication lines 6-2 to 6-5 of, e.g., a DIN cable.

The display unit U1 includes: a buffer amplifier 2 for amplifying a level of transmission data received via an input terminal IN; a controller 5 in the form of a microprocessor for controlling the entire display unit U1 based on the transmission data provided via an input port 9; an AND gate 3 for controlling transfer of the transmission data output from the buffer amplifier 2 based on a transfer permission signal A output from a control port 10 of the controller 5; and a buffer amplifier 4 for providing, after amplification, the transmission data output from the AND gate 3 to an output terminal OUT.

Each of the other display units U2–U4 has the same construction, that is, each has the buffer amplifier 2, AND gate 3, buffer amplifier 4, and controller 5.

In the above control system, transmission data is transmitted serially based on, e.g., an RS-232C communication system. FIG. 2(*a*) shows an exemplary communication format. The format includes in the order as written: a STX (start of transmission) code indicating the head of the data; an ID code indicating the transmission destination, i.e., (one of) the display units U1–U4; command data indicating a content of control; and an ETX (end of transmission) code indicating the end of the data. A plurality of command data can be transmitted in succession as shown in FIGS. 2(*b*) and 2(*c*). The ID code is made up of two characters selected from numerals 0 to 9 and alphabetical characters A, B, C, D, E and F, to constitute an ID code for indicating a display unit. The ID code may include one or two asterisks * in certain situations. For example, for an ID code "3A" indicating a certain display unit, valid ID codes are "3A", "*A", "3*" and "**".

Examples of commands are: "PON" (power on) for turning on a power; "POF" (power off) for turning off a power; "IN1" for switching an input to a video signal; "IN2" for switching an input to a Y/C signal; "CM1" for switching an operation mode to a white balance adjustment-1; "AJY" (adjust yes) for selecting an adjustment mode; and "AJN" (adjust no) for selecting a normal mode. These commands are to be preset.

Next, a description is made of communication data according to the invention, which is initialization data used in assigning ID codes to the respective display units U1–U4 when a control system is installed (or expanded). An exemplary serial data format is shown in FIG. 3. In FIG. 3, "id" represents an ID code of intended one of the display units U1–U4. For example, if the ID code of the intended display unit U1 is "11", "id" should be "11". Similarly, if the ID code of the intended display unit U2 is "12", "id" should be "12". In the format of FIG. 3, "command" represents data of an ID code setting instruction, e.g., "IDS" (ID set). Further, to set new ID codes for the respective display units U1–U4, it is necessary that the current ID codes be cleared. A command for such a purpose is, e.g., "IDC" (ID clear).

Figure 4:
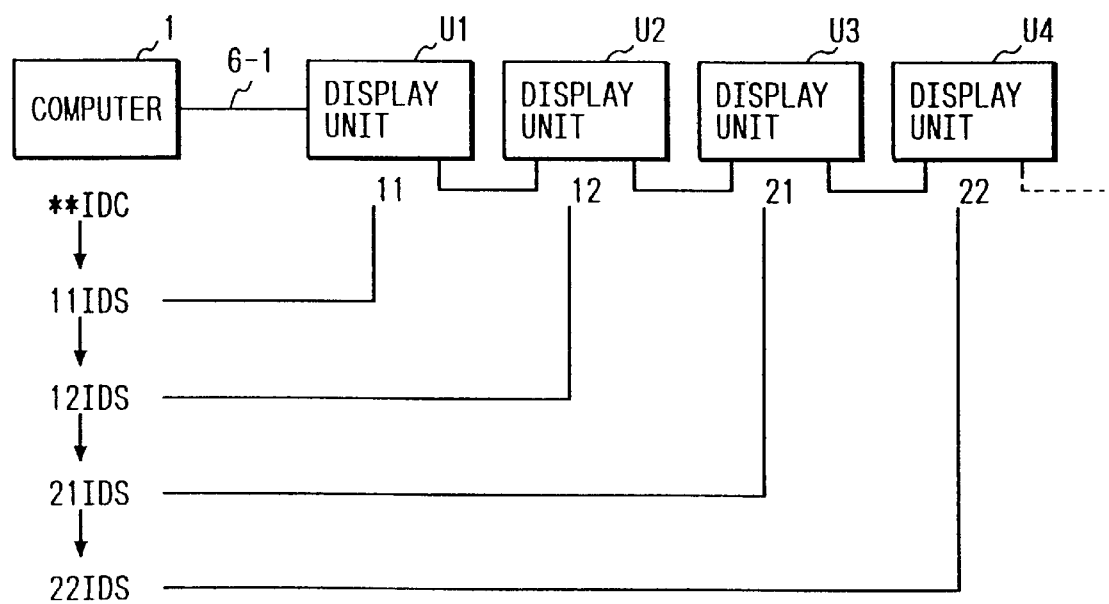
FIG. 4 is a diagram showing how ID command data are transmitted during an initializing operation.

An initializing operation for setting ID codes for the respective display units U1–U4 is described next. As shown in FIG. 4, a case is described in which ID codes 11, 12, 21 and 22 are to be set for the respective display units U1, U2, U3 and U4, respectively. In this case, serial data transmitted from the computer 1 are headed by "IDC" for clearing the current ID codes of the respective display units U1–U4, which is then followed sequentially by "11IDS", "12IDS", "21IDS" and "22IDS". The command "IDC" is common to all the display units U1–U4. The controller 5 of each display unit is programmed so that each display unit can decode this common command. Since "" is a sign meaning all the display units, the current ID codes of all the display units are cleared. Upon clearing of the ID codes, the control port 10 of the controller 5** of each of the display units outputs a low level signal "L".

Figure 5:
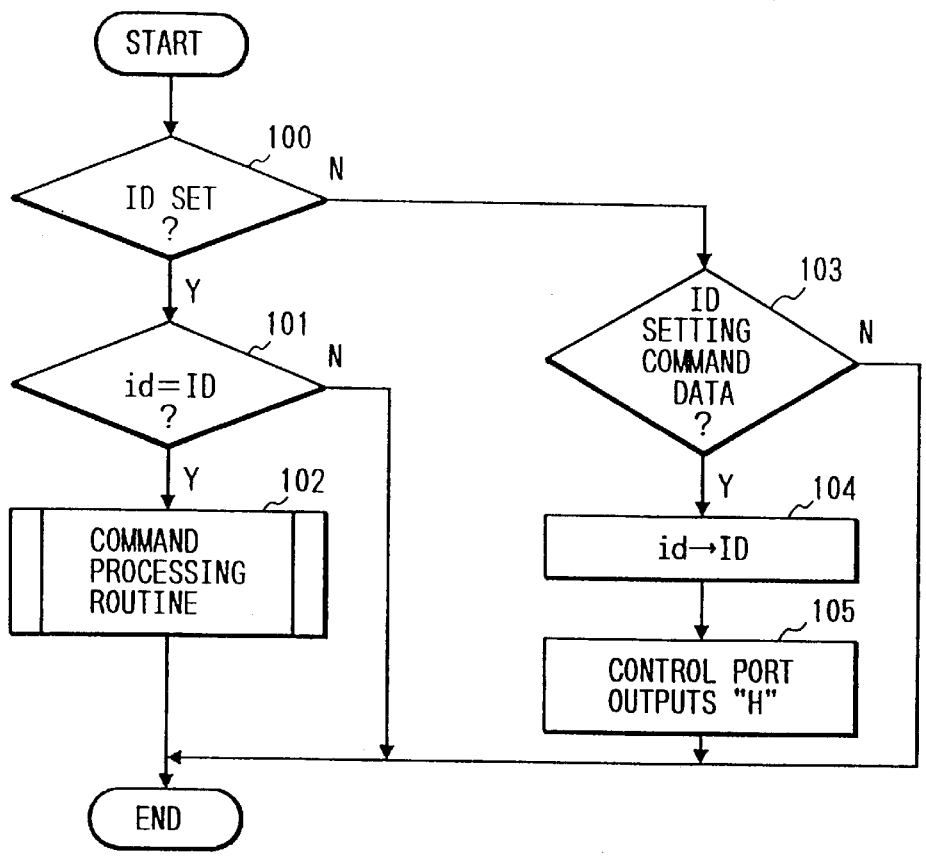
FIG. 5 is a flow chart showing an operation performed by a controller of each display unit.

The controller 5 of each of the display units U1–U4 executes an algorithm as shown in FIG. 5. Upon receiving serial data, the controller 5 judges whether or not an ID code has been set (Step 100). Since this is the initializing operation, the answer is "No", and the controller 5 proceeds to Step 103. In Step 103, the controller 5 judges whether or not the transmitted serial data is the ID setting command data. Since this is the initializing operation, the answer is "Yes", and the controller 5 employs a content "id" of the transmitted command data as its own ID code. For example, if the firstsent command data is "11IDS", the controller 5 of the first display unit U1 recognizes that its ID code is to be determined as "11", and stores the ID code "11" into a memory of the controller 5. If the ID code "11" is included in any kind of communication data received thereafter, the controller 5 controls the display unit U1 in accordance with the command included in that communication data. Upon completion of setting the ID code for the display unit U1, the controller 5 outputs a transfer permission signal A of a logic level "H" to the AND gate 3 from its control port 10 (Step 105). As a result, the AND gate 3, its input condition being satisfied, opens its gate and transfers next command data "12IDS" to the following display unit U2.

Similarly, the display unit U2 executes Steps 100, 103, 104 in this order to take in the ID code "12", outputs an "H" level transfer permission signal A from its controller 5, and transfers a next command "21IDS" to the display unit U3.

Figure 6:
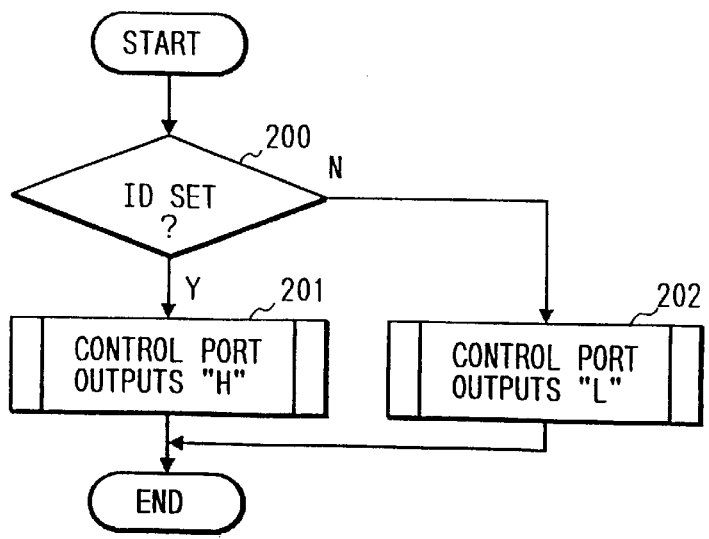
FIG. 6 is a flow chart showing how an output of an control port of the controller is produced.
Figure 7:
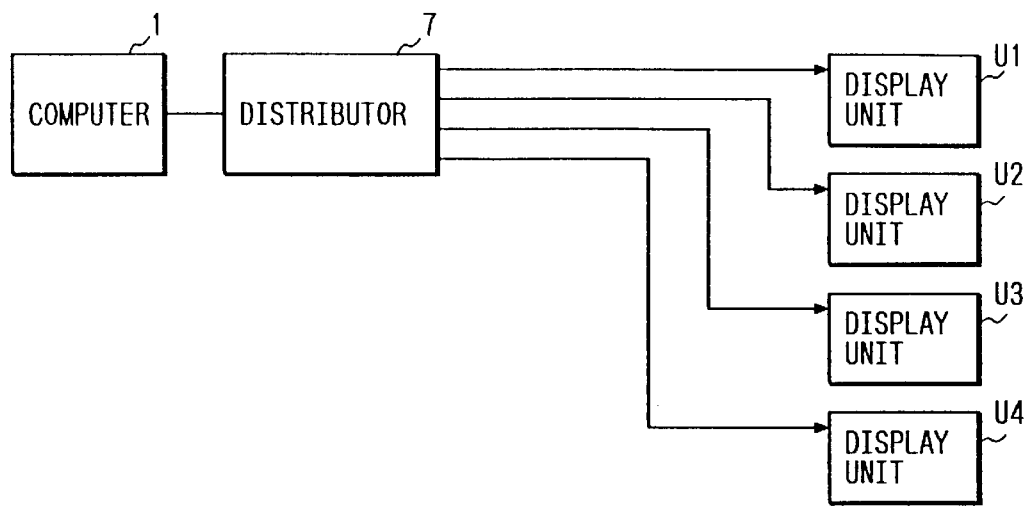
FIG. 7 is a block diagram showing a first example of a conventional communication network.
Figure 8:
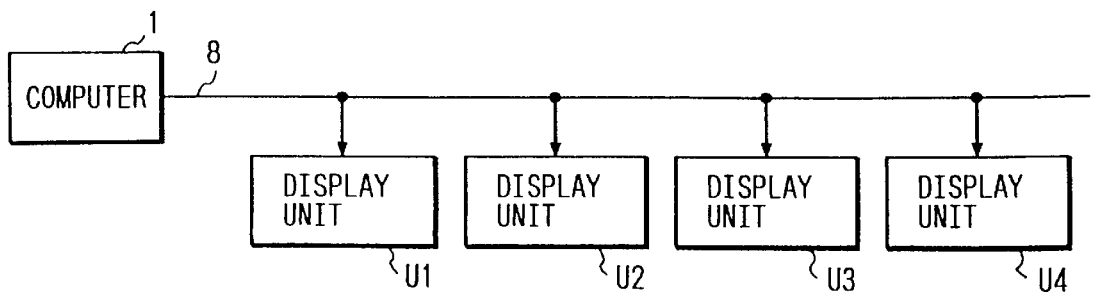
FIG. 8 is a block diagram showing a second example of a conventional communication network.

While the operation of setting. ID codes is performed as described above, the premiss of that operation, i.e., the output of the control port 10, is shown in a flow chart of FIG. 6. That is, during the initializing operation, the controller 5 of a display unit maintains the output of its control port 10 at a logic level "L" until the ID code of that particular display unit is set. Upon completion of setting the ID code, the controller 5 transfers subsequent serial data to the following display unit.

In operations other than the initialization, since the ID code has already been set, the controller 5 executes a command as instructed following Steps 100 (Yes), 101 and 102 in FIG. 5. Commands to be executed in this case are, e.g., "PON" for turning on a power, and "CM1" for switching an operation mode, as described above.

As described above, the ID codes of the respective display units U1–U4 are cleared by the command data "IDC", and then the "IDS" command data for initialization are sequentially transmitted from the computer 1, so that the respective display units U1–U4 automatically take in and set their own ID codes. As a result, no distributor is required as in the conventional example, nor are separate ID code setting switches and ROMs for the respective display units U1–U4, thereby allowing ID codes to be set only by preparing command data to be sent from the computer 1** (i.e., only by making an appropriate program). This not only facilitates the ID code setting when additional display units are provided, but also gives a higher degree of freedom in system expansion.

As described in the foregoing, according to the invention, each of the units to be controlled takes in a first-received ID code and recognizes that ID code as its own ID code, and then transfers a next ID code to a following unit via a transfer gate after having recognized the first ID code as its own ID code. Therefore, the system can be expanded without using any special components as would be required in the prior art.

Since a buffer amplifier is disposed on both the input and output sides of each display unit, signal level attenuation can be prevented even if the communication line becomes longer, thereby allowing the system to be expanded without causing defective operations.

Further, unlike the case of using a bus, in which a plurality of parallel lines are required, the serial data transmission of the invention allows data to be transmitted by, e.g., a pair of lines twisted. In addition, since the respective display units can be connected in a cascade manner, the system construction can be simplified.

What is claimed is:

1. A data transfer control system for controlling transmission of serial command data to a plurality of units connected in series, said system having an identification code initializing system for assigning each unit a unique identification code, said initializing system comprising:

said plurality of units connected in series, each of said units having separate input and output ports and each output port is connected to the input port of an immediately successive unit in the series connection;

computer means for transmitting to respective units in a sequential manner identification setting command data including an exclusive identification code, said computer means is connected by only a single line to a first unit of said plurality of units connected in series; and means, at each of the plurality of units, for receiving an identification code included in first-received identification setting command data as an identification code of an associated unit without transferring the received identification code to an immediately following unit, and for transferring subsequently received identification setting command data to an immediately following unit so that said immediately following unit will have an identification code included in the transferred identification setting command data.

2. The system of claim 1, wherein the computer means transmits, prior to transmitting the identification setting command data, command data common to all the plurality of units, for clearing current identification codes of the respective units.

3. The system of claim 1, wherein the receiving and transferring means comprises:

a first buffer amplifier for receiving the serial command data;

a controller for receiving in the identification code of the first-received identification setting command data as the identification code of the associated unit, and for producing a signal instructing transfer of the subsequently received identification setting command data to the following unit;

allowing means, coupled to the first buffer amplifier, for allowing the transfer through said first buffer amplifier from said computer means of the subsequently received identification setting command data upon receipt of the transfer instructing signal from the controller; and a second buffer amplifier, coupled to the allowing means, for receiving the subsequently received identification setting command data from said allowing means and for outputting it to said immediately following unit.

4. The system of claim 3, wherein the allowing means comprises an AND gate for taking a logical multiplication of an output signal of the first buffer amplifier and the transfer instructing signal from the controller, said output signal of the first buffer amplifier representing data sent through said first buffer amplifier by said computer means.

5. A data transfer control system comprising:

computer means for transmitting serial command data including an identification code and a command; and a plurality of units connected in series, each of said units having separate input and output ports and each output port being connected to the input port of an immediately successive unit in the series connection, wherein said computer means is connected by only a single line to a first unit of said plurality of units connected in series, each of the units comprising:

a first buffer amplifier for receiving the serial command data;

a controller connected to the output of said first buffer amplifier, for controlling the respective unit to process the received command if the received identification code coincides with an identification code of the respective unit, and for producing a signal instructing transfer of the serial command data if the received identification code does not coincide with the identification code of the respective unit;

allowing means for allowing the command data to pass through the allowing means upon receipt of the transfer instructing signal from the controller; and a second buffer amplifier having an input connected to the output of said allowing means and an output connected to the output port of said unit, for providing the serial command data received from the allowing means to a next series-connected unit;

wherein the controller includes means for setting the received identification code as its own identification code without transferring the received identification code to an immediately sequential unit if the respective identification code has not previously been set, and for transferring, if the respective identification code has been set, said received identification code to said immediately sequential unit which will set said received identification code as its own code if the respective identification code has not previously been set.

6. The data transfer control system of claim 5, wherein the controller produces the transfer instructing signal after employing the received identification code as its own respective identification code.

7. A method of processing serial command data including an identification code and a command transmitted from a computer, in each of a plurality of units connected in series, each of said units having separate input and output ports and each output port being connected to the input port of an immediately successive unit in the series connection, wherein said computer is connected by only a single line to a first unit of said plurality of units connected in series, comprising the steps of:

receiving the serial command data;

judging whether an identification code has been set in the unit;

judging, if the identification code has been set, whether the received identification code coincides with the set identification code;

processing, if the received identification code coincides with the set identification code, the received command in the unit; and opening, if the received identification code does not coincide with the set identification code, a transmission path through said unit to a next series-connected unit; the method further comprising the steps of:

setting, if the identification code has not been set, the received identification code as the identification code for that particular unit without transferring the received identification code to a next sequential unit; and transferring the received identification code to said next sequential unit if the identification code has been set, so that said next sequential unit will set said received identification code as its own.

8. The method of claim 7, further comprising the step of opening the transmission path to the next sequential unit after storing the received identification code.

9. A data transfer control system comprising:

computer means for transmitting serial command data including an identification code and a command; and a plurality of units connected in series, each of said units having an input and an output port and each output port being connected to the input port of an immediately successive unit in the series connection, wherein said computer means is connected by only a single line to a first unit of said plurality of serially-connected units, each of said units comprising:

means for clearing a current identification code in response to command data transmitted from said computer means when the system is set up;

means for receiving the serial command data;

means for setting an address of a first-received identification code as an own address of the unit;

means for judging whether an address of the received identification code coincides with the own address;

means for processing, if the address of the received identification code coincides with the own address, the received command by effecting functions of the unit;

means for disabling, if the address of the received identification code coincides with the own address, transfer of the received serial command data to a next series-connected unit; and means for enabling, if the address of the received identification code does not coincide with the own address, transfer of the received serial command data to the next series-connected unit.

10. The data transfer control system of claim 9, wherein said disabling means comprises an IC circuit, and wherein said IC circuit includes an AND gate.

11. The data transfer control system of claim 9, wherein said clearing means clears the current identification code according to a predetermined program that has been set in a controller of the unit.

12. A method of processing serial command data including an identification code and a command transmitted from a computer, in each of a plurality of units connected in series, each of said units having an input and an output port, each output port being connected to the input port of an immediately successive unit in the series connection, wherein said computer is connected by only a single line to a first one of said plurality of serially-connected units, the method comprising the steps of:

clearing a current identification code upon setting up of a system including said computer and said plurality of units;

receiving serial command data for initializing;

setting an address of a first-received identification code as an own address of the unit;

enabling transfer of subsequently received serial command data for initializing to a next series-connected unit;

receiving serial command data other than for initializing;

judging whether an address of a received identification code coincides with the own address;

processing, if the address of the received identification code coincides with the own address, the received command by effecting functions of the unit;

disabling, if the address of the received identification code coincides with the own address, transfer of the received serial command data to the next series-connected unit; and enabling, if the address of the received identification code does not coincide with the own address, transfer of the received serial command data to the next series-connected unit.

13. The method of claim 12, wherein in the clearing step the current identification code is cleared according to a predetermined program that has been set in a controller of the unit.

* * * * *